United States Patent
Bell et al.

(10) Patent No.: US 6,383,599 B1
(45) Date of Patent: May 7, 2002

(54) CARPET WITH INTEGRATED VENTILATION DUCT AND FOOTREST AND METHOD FOR MAKING SAME

(75) Inventors: Larry W. Bell, Canton; Medard E. Kaluszka, Sterling Heights; Jeff D. Stevenson, Shelby Township; Peter J. Schwartz, Clinton Township, all of MI (US)

(73) Assignees: DaimlerChrysler Corporation, Auburn Hills; Lear Corporation, Southfield, both of MI (US)

( * ) Notice: Subject to any disclaimer, the term of this patent is extended or adjusted under 35 U.S.C. 154(b) by 0 days.

(21) Appl. No.: 09/262,256

(22) Filed: Mar. 4, 1999

(51) Int. Cl.[7] ................ B32B 3/02; B60J 7/00
(52) U.S. Cl. ............. 428/95; 428/188; 296/97.23; 296/208
(58) Field of Search ............. 428/85, 95, 188, 428/304.4; 296/208, 97.23; 4/417

(56) References Cited

U.S. PATENT DOCUMENTS

| 4,721,641 A | 1/1988 | Bailey |
| 4,726,438 A | 2/1988 | Stuertz et al. |
| 4,747,636 A | * 5/1988 | Harasaki et al. ............ 296/208 |
| 5,162,092 A | * 11/1992 | Klobucar et al. ........... 264/513 |
| 5,254,384 A | * 10/1993 | Gordon ....................... 428/71 |
| 5,700,050 A | 12/1997 | Gonas |
| 5,846,461 A | 12/1998 | Collins et al. |
| 6,106,045 A | * 8/2000 | Gac et al. ................... 296/208 |

* cited by examiner

Primary Examiner—Donald J. Loney
(74) Attorney, Agent, or Firm—Edwin W. Bacon, Jr.

(57) ABSTRACT

A carpet assembly for a motor vehicle is provided. The carpet assembly includes a carpet fitted to cover the floor pan of the motor vehicle. A plastic ventilation duct is disposed below the carpet and extends from the heating and air conditioning system in the instrument panel to beneath the front row of seats. A hard foam blocked footrest is also disposed below said carpet. Polyurethane foam is provided below the carpet not only to provide cushion for the carpet but also to attach the ventilation duct and footrest to the carpet, thereby providing a unitary carpet assembly. The foam is formed substantially about the ventilation duct to reduce the heat transfer between the conditioned air and the surroundings.

10 Claims, 3 Drawing Sheets

CARPET WITH INTEGRATED VENTILATION DUCT AND FOOTREST AND METHOD FOR MAKING SAME

BACKGROUND OF THE INVENTION

1. Technical Field

The present invention generally relates to carpet assembly for automotive vehicles. More particularly, the present invention relates to an automotive carpet system that includes a ventilation duct and a footrest integrated into the carpet assembly. More specifically, but without restriction to the particular embodiment and/or use which is shown and described for the purposes of illustration, the present invention relates to a process by which a ventilation duct and a footrest can be integrated into a one-piece carpet automotive carpet system.

2. Discussion

Most automotive vehicles carry a number of passengers. Typically, these passengers are disposed in rows throughout the vehicle. The driver and front seat passenger are traditionally disposed in a front row of seats. Additional passengers are located in a rear row of seats. Typical sedans have 2 rows of seats. Other vehicles, such as sport utility vehicles, station wagons, buses, and trucks may have a front row of seats and one or more rear rows of seats.

In order to control the temperature in the vehicle cabin, a heating, ventilation, and air conditioning system (HVAC) is provided. The HVAC cooperates with the engine of the vehicle to force conditioned air into the cabin of the vehicle. Typically, the HVAC provides the conditioned air to the cabin via vents in the instrument panel of the vehicle. This location is generally chosen for its close proximity to the engine. The location of these vents provides ample conditioned air to the front row occupants of a vehicle; however, the rear row occupants obtain minimal conditioned air from vents located in the instrument panel.

There have been a number of alternatives that supply conditioned air directly to the passengers located in the second row and beyond. Ducts have typically been formed through the center console of the vehicle or have been placed under the automotive carpet to provide a vent near a rear row occupants' feet. The ducts, usually made of plastic, come into the automobile assembly plant as separate parts. The ducts are attached directly to the floor pan of the vehicle body by fasteners. After this operation, the carpet is placed over the floor pan and ventilation duct. The carpet is supplied with an opening near the end of the duct to provide a vent for the rear seat occupants. This can lead to many build issues and variations during the manufacture of a vehicle.

To provide additional comfort to the driver of the vehicle it is desirable to include a footrest or dead pedal for the drivers left foot. Footrests are normally formed by sheet metal structures under the carpet. Construction changes to vehicles that involve bringing the front seat occupants closer to the front wheels have made it difficult to maintain a footrest. Prior to this construction trend it would have been relatively easy to construct a foot rest by changing the shape of a piece of sheet metal or by adding a bracket to support the dead pedal. The aforementioned construction trend has forced the sheet metal for the dash, the wheel opening, and the side panel to intersect at roughly the same location as desired for the footrest. This has made it extremely difficult to provide a footrest in the traditional method.

There has been a need to reduce parts and operations within an automotive assembly plant by removing unnecessary components. There has also been a need to improve the fit and finish of an automotive carpet. A reduction in the amount of heat transfer between the ventilation ducts and its surrounding is also desired. There is also a need to provide a footrest integrated with the carpet so as to simplify the sheet metal build processes.

SUMMARY OF THE INVENTION

Accordingly, it is a principal objective of the present invention to provide a carpet assembly with an integrated ventilation duct and a footrest to reduce the amount of parts and complexity introduced to an automotive assembly plant.

It is another objective to provide an integrated ventilation duct and carpet assembly that limits heat transfer between a ventilation duct and its surroundings.

It is yet another objective to provide an integrated footrest and carpet to eliminate excessive modifications to the sheet metal of a vehicle.

It is a further objective of the invention to provide a process to manufacture an integrated carpet assembly that includes a ventilation duct and a footrest.

In one form, the present invention provides a carpet assembly for a motor vehicle. The carpet assembly includes a carpet fitted to cover the floor pan of the motor vehicle. A plastic ventilation duct is disposed below the carpet and extends from the heating and air conditioning system in the instrument panel to beneath the front row of seats. A hard foam blocked footrest is also disposed below said carpet. Polyurethane foam is provided below the carpet not only to provide cushion for the carpet but also to attach the ventilation duct and footrest to the carpet, thereby providing a unitary carpet assembly. The foam is formed substantially about the ventilation duct to reduce the heat transfer between the conditioned air and the surroundings.

In another form, the present invention provides a method for producing a carpet assembly for a motor vehicle. This method comprises the general steps of:

1. Placing a formable carpet on the A-side of a mold;
2. Attaching a ventilation duct and a footrest to the B-side of the mold temporarily;
3. Pouring polyurethane on the back side of the carpet such that the foam rises and forms about the ventilation duct and the footrest;
4. Closing said mold so that an inner foam cavity is constructed to construe the rising foam in the desired formation; and
5. Removing the carpet, ventilation duct, footrest, and cured foam as a one-piece assembly.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

FIG. 3 is a cross sectional view along the line 3—3 of FIG. 1;

DETAILED DESCRIPTION OF THE PREFERRED EMBODIMENT

Figure 1:
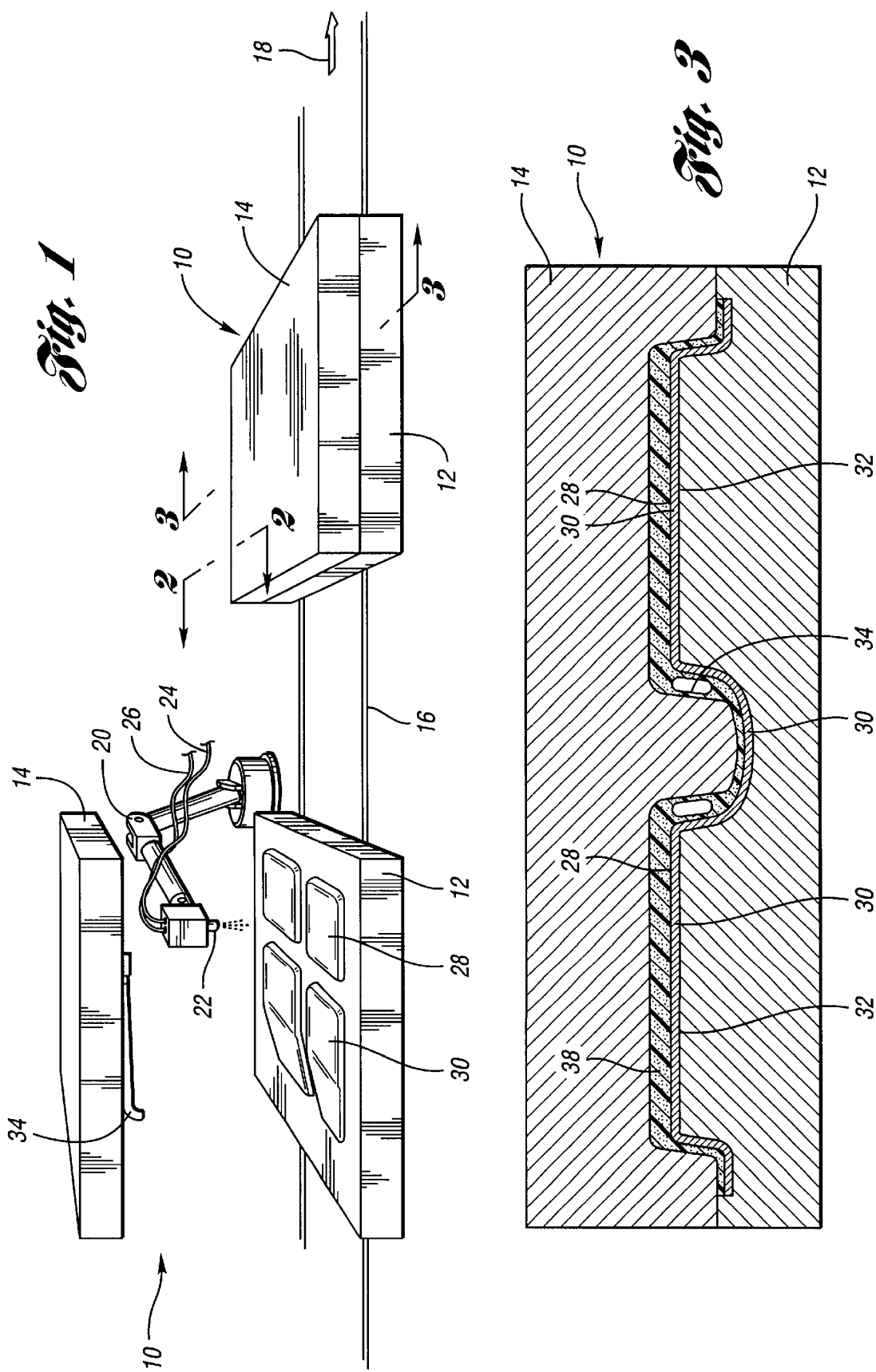
FIG. 1 is a view illustrating the process of producing a carpet assembly, polyurethane foam is dispensed onto the back of a carpet on the left, and a closed mold allowing the polyurethane foam to cure is shown on the right.

The process by which a carpet with integrated ventilation duct and footrest is illustrated in FIG. 1. A polyurethane mold 10 is provided. Molds of this type are typically constructed from aluminum and include a system of water jacket tubes formed therein. Polyurethane foam reactions are exothermic and create a significant amount of heat that can be controlled by use of such water jacket tubes. Mold 10 is separable into two parts: the A-side 12 and the B-side 14. A-side 12 of mold 10 is attached to a conveyor 16 that moves in a direction 18. Typically, most conveyors are constructed in a circular manner so as to allow for pouring of the foam, removal of the part, and preparation of the mold in the time its takes for the mold to complete one revolution. B-side 14 of mold 10 is typically attached to the same or similar conveyor in order to move with A-Side 12 of mold 10. Generally, the B-side 14 is capable of being either pivoted or elevated, the elevated type is shown in FIG. 1. Hydraulic pistons or the like are used to support the B-side of the mold in such a manner.

Focusing on mold 10 to the left of FIG. 1, a polyurethane pouring machine 20 is shown in a position suitable to dispense polyurethane foam to the A-side 12 of mold 10. Polyurethane foam is produced by mixing diisocyanate and macroglycol, a so-called polyol, in the mixing head 22 of pouring machine 20. Additional ingredients are also commonly used to produce flexible foam such as catalysts, water, and surfactants. These ingredients are often included in the polyol feed 24. The diisocyanate feed 26 to mixing head 22 is separate from polyol feed 24. Mixing head 22 operates at very high pressures to ensure that the diisocyanate and polyol are sufficiently mixed. This mixture is dispensed from head 22 onto the backside 28 of a carpet 30 that is formed commensurate with A-side 12 of mold 10.

The show side 32 of carpet 30, the side that is to be visible in a motor vehicle, is in contact with A-side 12 of mold 10. The dispensed foam does not contact show side 32 of carpet 30. Machine 20 is capable of dispensing foam in various patterns. As the polyol and diisocyanate mix a foaming reaction begins. The foam begins to spread over backside 28 of carpet 30 as the B-side 14 of mold 10 is lowered into contact with A-side 12, so as to form a cavity 38 for the polyurethane foaming reaction to occupy. Attached to the B-side 14 of mold 10 via pins 44 is a ventilation duct 34 and a hard foamed footrest 36. As B-side 14 is lowered ventilation duct 34 comes in contact with the rising foam. The dispensing pattern does not directly pour foam on the area for footrest 36; however, cavity 38 is formed directly above footrest 36 such that reacting foam will cover footrest 36 to lock it in place. Polyurethane foam has adhesive qualities as it is reacting and curing. When the reacting or rising foam contacts the backside 28 of carpet 30, ventilation duct 34, or footrest 36 an adhesion bond is formed, thereby producing a unitary structure.

Figure 2:
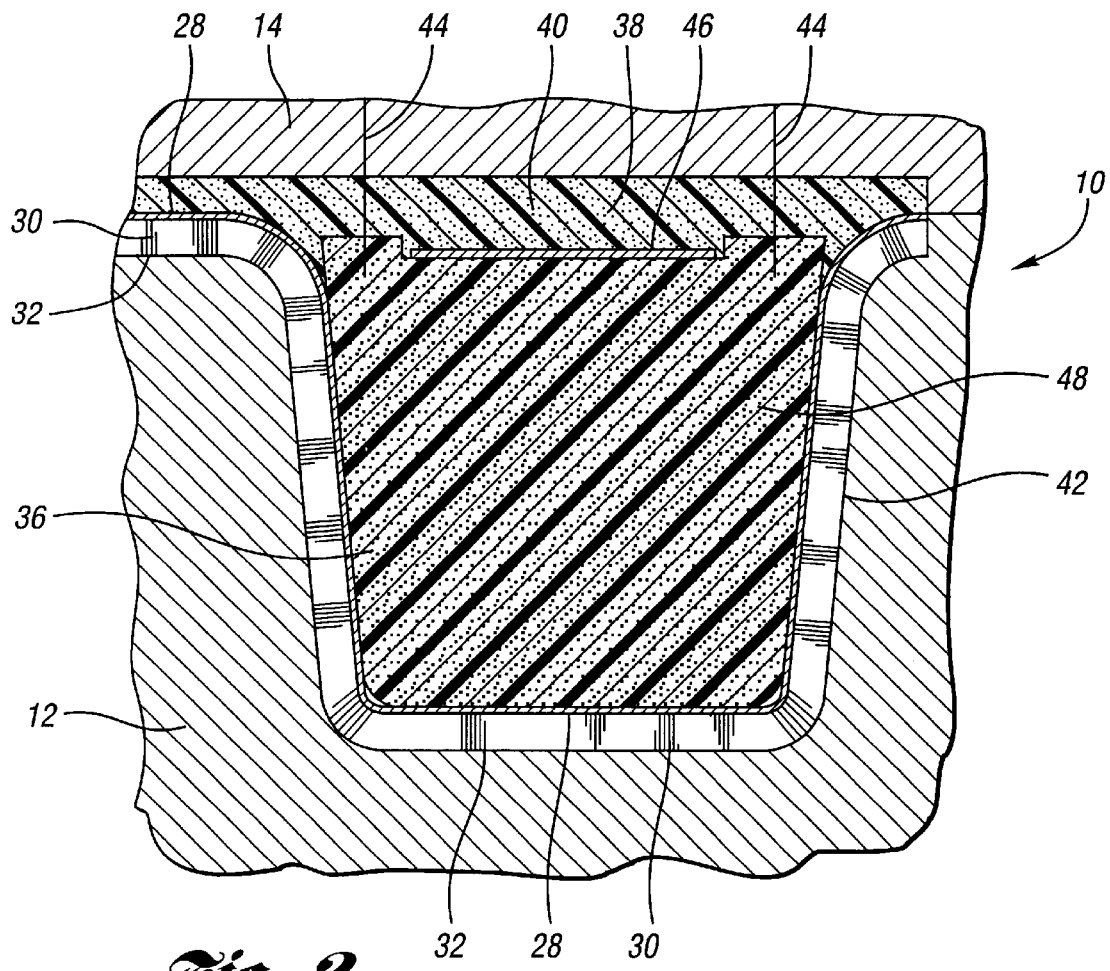
FIG. 2 is a cross sectional view along the line 2—2 of FIG. 1.

FIG. 2 shows the construction of footrest 36, polyurethane foam 40, and carpet 30 within mold 10. A-side 12 of mold 10 accepts carpet 30 into a pocket 42 formed therein. As B-side 14 of mold 10 comes a contact A-side 12, footrest 36 which is attached to B-side by pins 44 is guided within pocket 42. Cavity 38 is formed above footrest 36 to allow polyurethane foam 40 to form therein. Polyurethane foam 40 is adheres to both carpet 30 and footrest 36 thereby locking footrest 36 in location with carpet 30. Footrest 36 includes a thin metal plate 46 to provide additional rigidity to hard foam block 48 to provide the necessary structure for a footrest or a dead pedal for the operator.

FIG. 3 shows the construction of ventilation duct 34, polyurethane foam 40, and carpet 30 within mold 10. Cavity 38 is formed around ventilation duct 34 so as to allow polyurethane foam to substantially encapsulate duct 34. Polyurethane foam has considerable insulative qualities that will reduce the heat transfer between the ventilation duct 34 and the surrounding components.

Figure 5:
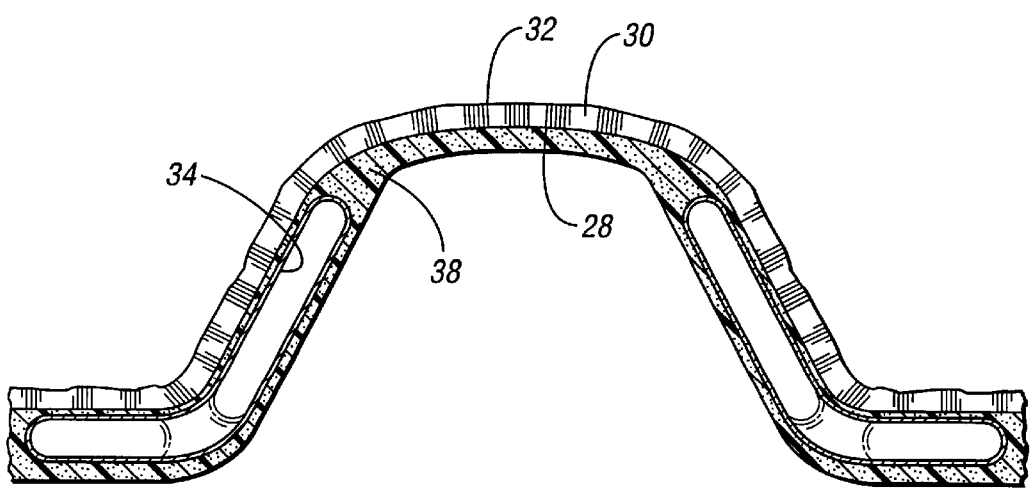
FIG. 5 is a cross sectional view along the line 5—5 of FIG. 4.
Figure 4:
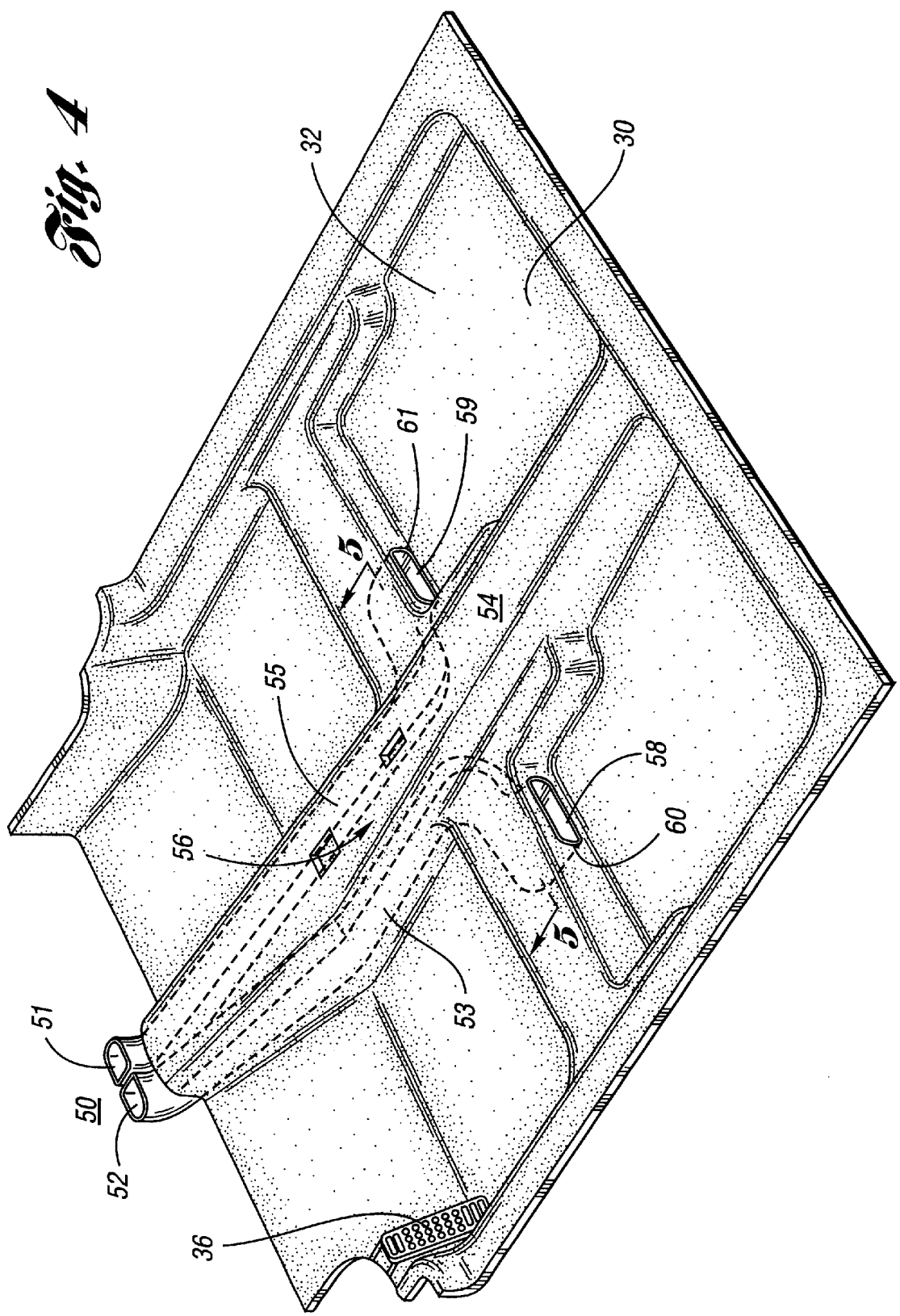
FIG. 4 is a perspective view of an automotive carpet assembly.

As illustrated in FIGS. 3, 4 and 5, ventilation duct 34 extends from the instrument panel area 50 of a vehicle to underneath the front seats (not shown). Duct 34 is attached to a HVAC system (not shown) at openings 51, 52 to provide conditioned air to the rear seat passengers. Duct 34 is formed in two passageways 53, 55, the passageways extend rearward in the vehicle and are disposed on opposite sides of the tunnel 54 of the vehicle. The passageways 53, 55 are disposed to the sides of tunnel 54 so as to not interfere with the height or the cargo capacity of the center console which would generally be located in an area denoted by reference numeral 56. Tunnel 54 is provided to accommodate the drive shaft of the vehicle. Each passageway 53, 55 has an exit 58, 59 that compliments an opening 60, 61 in the carpet 30. One can appreciate that supplying air from the HVAC system through ventilation duct 34 is an effective means to provide conditioned air to the rear seat occupants.

While the above description constitutes the preferred embodiment of the invention, it will be appreciated that the invention is susceptible to modification, variation, and change without departing from the proper scope or fair meaning of the accompanying claims.

What is claimed is:

1. A carpet assembly for an automobile comprising:
   a carpet having a show side and a backside;
   a ventilation duct; and
   a foam material adhering said ventilation duct to said backside of said carpet.

2. The invention as set forth in claim 1, wherein said ventilation duct extends from the instrument panel of said automotive vehicle to below the front seat of said automotive vehicle; wherein said duct is capable of delivering conditioned air to the rear seat occupants of said automotive vehicle.

3. The invention as set forth in claim 2, wherein said carpet includes openings therethrough to provide an exit for said duct near the rear seat occupants of said automotive vehicle.

4. The invention as set forth in claim 1, wherein at least two of said ventilation ducts straddle a tunnel of said automotive vehicle, said tunnel adapted to accommodate a drive shaft of said automotive vehicle.

5. The carpet assembly of claim 1 wherein said foam material substantially surrounds said ventilation duct.

6. The invention of claim 1 wherein said foam material is a polyurethane foam.

7. The invention of claim 1 wherein said ventilation duct is made of plastic.

8. The invention of claim 1 wherein said carpet assembly is shaped to substantially conform to a floor pan of said automotive vehicle.

9. The invention of claim 1 wherein said foam material is a thermal insulator.

10. A carpet assembly for a motor vehicle having a first and a second row of seats, a heating and air conditioning system, a tunnel for accommodation of a drive shaft, and a floor pan, said carpet assembly comprising:

a carpet fitted to cover the floor pan of the vehicle;

a plastic ventilation duct disposed below said carpet, said ventilation duct extending from the heating and air conditioning system to beneath the front row of seats, wherein said ventilation duct is adapted to provide occupants in the second row of seats with conditioned air from the heating and air conditioning system; and polyurethane foam disposed below said carpet and substantially about said ventilation duct; said duct includes at least two side passageways, said passageways straddle the tunnel of said vehicle; each of said passageway adapted to provide conditioned air to one side of said occupants in the second row.

\* \* \* \* \*